US011713008B2

(12) United States Patent
Van Hoecke et al.

(10) Patent No.: US 11,713,008 B2
(45) Date of Patent: Aug. 1, 2023

(54) METHOD AND APPARATUS FOR DRIVER-CENTRIC FUEL EFFICIENCY DETERMINATION AND UTILIZATION

(71) Applicant: FORD GLOBAL TECHNOLOGIES, LLC, Dearborn, MI (US)

(72) Inventors: Patrick Lawrence Jackson Van Hoecke, Dearborn, MI (US); Hamid M. Golgiri, Dearborn, MI (US); Anthony Melatti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 17/144,305

(22) Filed: Jan. 8, 2021

(65) Prior Publication Data
US 2021/0129777 A1   May 6, 2021

Related U.S. Application Data

(62) Division of application No. 15/869,324, filed on Jan. 12, 2018, now Pat. No. 10,913,410.

(51) Int. Cl.
| | |
|---|---|
| *B60R 16/023* | (2006.01) |
| *B60W 30/14* | (2006.01) |
| *G09B 5/06* | (2006.01) |
| *G09B 19/16* | (2006.01) |
| *B60W 40/09* | (2012.01) |
| *B60W 50/14* | (2020.01) |

(52) U.S. Cl.
CPC ....... *B60R 16/0236* (2013.01); *B60W 30/143* (2013.01); *B60W 40/09* (2013.01); *B60W 50/14* (2013.01); *G09B 5/06* (2013.01); *G09B 19/167* (2013.01); *B60W 2050/143* (2013.01); *B60W 2540/10* (2013.01); *B60W 2540/12* (2013.01); *B60W 2540/16* (2013.01); *B60W 2540/30* (2013.01); *B60W 2555/60* (2020.02)

(58) Field of Classification Search
USPC .......................................................... 701/93
See application file for complete search history.

(56) References Cited

U.S. PATENT DOCUMENTS

| | | | |
|---|---|---|---|
| 8,509,987 B2 | 8/2013 | Resner | |
| 9,780,967 B2 | 10/2017 | Sargent et al. | |
| 2011/0112717 A1* | 5/2011 | Resner | G07C 5/008 701/31.4 |
| 2012/0072049 A1* | 3/2012 | Haaf | G01D 4/00 701/1 |
| 2014/0107912 A1* | 4/2014 | Yucel | G07C 5/085 701/1 |

(Continued)

*Primary Examiner* — Tyler D Paige
(74) *Attorney, Agent, or Firm* — Joseph Zane; Brooks Kushman P.C.

(57) ABSTRACT

A system includes a processor configured to receive a user profile responsive to an efficiency determination request for a vehicle model. The processor is also configured to obtain efficiency-affecting data from the user profile. The processor is further configured to compare the efficiency-affecting data to data gathered from drivers of the vehicle model, to determine a correlation between the user profile and similar drivers of the vehicle model. Also, the processor is configured to predict fuel efficiency for the new vehicle model based on efficiency achieved by the similar drivers.

18 Claims, 4 Drawing Sheets

(56) References Cited

U.S. PATENT DOCUMENTS

| | | | |
|---|---|---|---|
| 2016/0098869 A1* | 4/2016 | Rood | G07C 5/0808 |
| | | | 701/32.7 |
| 2016/0252381 A1* | 9/2016 | Kwak | G07C 5/0825 |
| | | | 701/123 |
| 2017/0269599 A1 | 9/2017 | Ansari | |

* cited by examiner

METHOD AND APPARATUS FOR DRIVER-CENTRIC FUEL EFFICIENCY DETERMINATION AND UTILIZATION

CROSS-REFERENCE TO RELATED APPLICATIONS

This application is a divisional of U.S. application Ser. No. 15/869,324 filed Jan. 12, 2018, now U.S. Pat. No. 10,913,410, issued Feb. 9, 2021, the disclosure(s) of which is hereby incorporated in its entirety by reference herein.

TECHNICAL FIELD

The illustrative embodiments generally relate to methods and apparatuses for driver-centric fuel efficiency determination and utilization.

BACKGROUND

On virtually every vehicle price tag and every website advertising a vehicle is a miles per gallon (MPG) or other efficiency statistic. While this may represent operation of the vehicle at certain speeds under certain conditions driven by a certain type of driver, most people purchasing a vehicle find that the actual MPG achieved by the vehicle, when used in daily use, varies somewhat significantly from an advertised value.

The reasons for the variance are many, as factors from speed, to congestion, to weather, to road conditions, to driving behavior can all cause variances in experienced MPG. Since a manufacturer cannot model all of these variables, a number based on a set of standards is instead provided. As long as all manufacturers adhere to similar standards, the number can be useful for comparing one vehicle to another, because it should, presumably, reflect the achievable differences and general efficiency of a given vehicle compared to another vehicle.

Nonetheless, it is sometimes irritating to a driver or owner when a different MPG or efficiency value is realized in a real world environment. Further, certain vehicles are impacted differently than other vehicles in certain circumstances, so while a driver who commonly drives sport utility vehicles (SUVs) may know that they typically achieve approximately 85% of a manufacturer estimated MPG when driving their common routes in SUVs, the driver may not be able to directly translate this data into a sedan, for example. This means that if the driver changes vehicle class, the driver may have to hazard a somewhat wild guess as to what MPG or efficiency will be achieved in the new class of vehicle.

SUMMARY

In a first illustrative embodiment, a system includes a processor configured to receive a user profile responsive to an efficiency determination request for a vehicle model. The processor is also configured to obtain efficiency-affecting data from the user profile. The processor is further configured to compare the efficiency-affecting data to data gathered from drivers of the vehicle model, to determine a correlation between the user profile and similar drivers of the vehicle model. Also, the processor is configured to predict fuel efficiency for the new vehicle model based on efficiency achieved by the similar drivers.

In a second illustrative embodiment, a system includes a processor configured to receive an efficiency improvement request from a first driver of a vehicle model. The processor is also configured to find recorded driver-behavior data for a second more efficient driver, having traveled in a same-model vehicle over a road segment similar to an upcoming route segment for the first driver. Further, the processor is configured to instruct the first driver, while traveling the route segment, to match behavior recorded for the second driver over the road segment.

In a third illustrative embodiment, a system includes a processor configured to receive an efficient cruise-control request. The processor is also configured to determine a portion of an upcoming route for which mirroring data, representing gathered drive data from an efficient driver previously traveling the portion achieved a threshold efficiency. The processor is further configured to use cruise-control to cause the vehicle to mirror recorded behavior of the efficient driver over the portion, when a vehicle from which the request was made reaches the portion.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
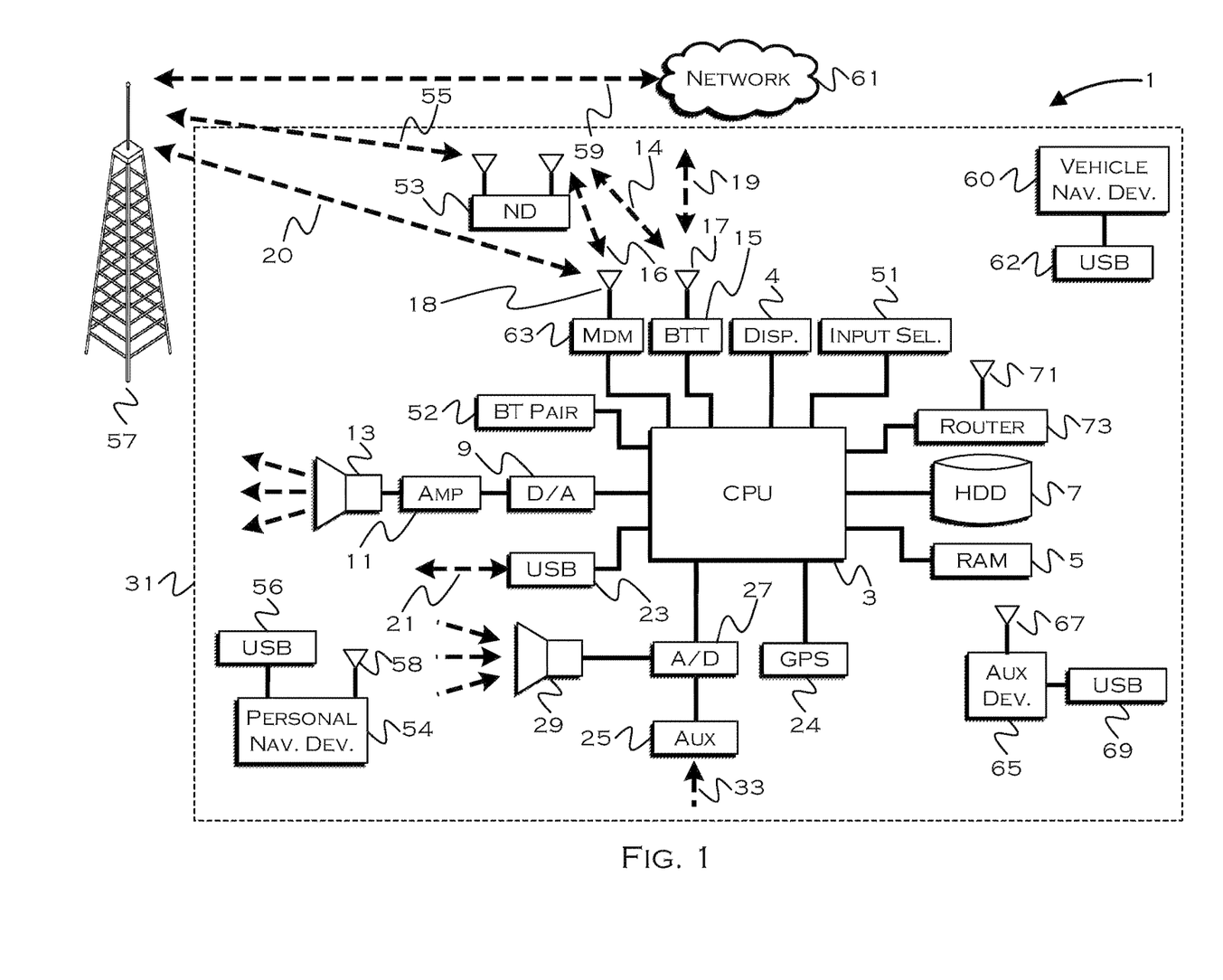
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Depending on where, when and how people drive, the same model and class of vehicle being driven by two different people may experience wildly different efficiency values. Vehicle loads decrease efficiency, stop and go traffic can be a significant fuel-burner, and rapid acceleration can quickly use fuel, just to name a few non-limiting examples. While driving behavior may be significantly different from driver to driver, the behavior may tend to remain generally the same for a given individual. That is, whether the person is driving an SUV, a sedan or a sports car, the user may have some behavioral characteristics that typically do not change.

Similarly, the routes driven by an individual typically do not change. So, regardless of the type of vehicle driven by a driver, the driver typically drives the same route to work, school, the store, etc. Knowing that the driver behavior is fairly consistent and that routing is fairly consistent, the illustrative embodiments provide methods and apparatuses for allowing fuel efficiency predictions for an individual across a variety of vehicles, whether or not the individual has ever even driven one of the vehicles, or even a vehicle of the same class as a vehicle of interest.

Figure 2:
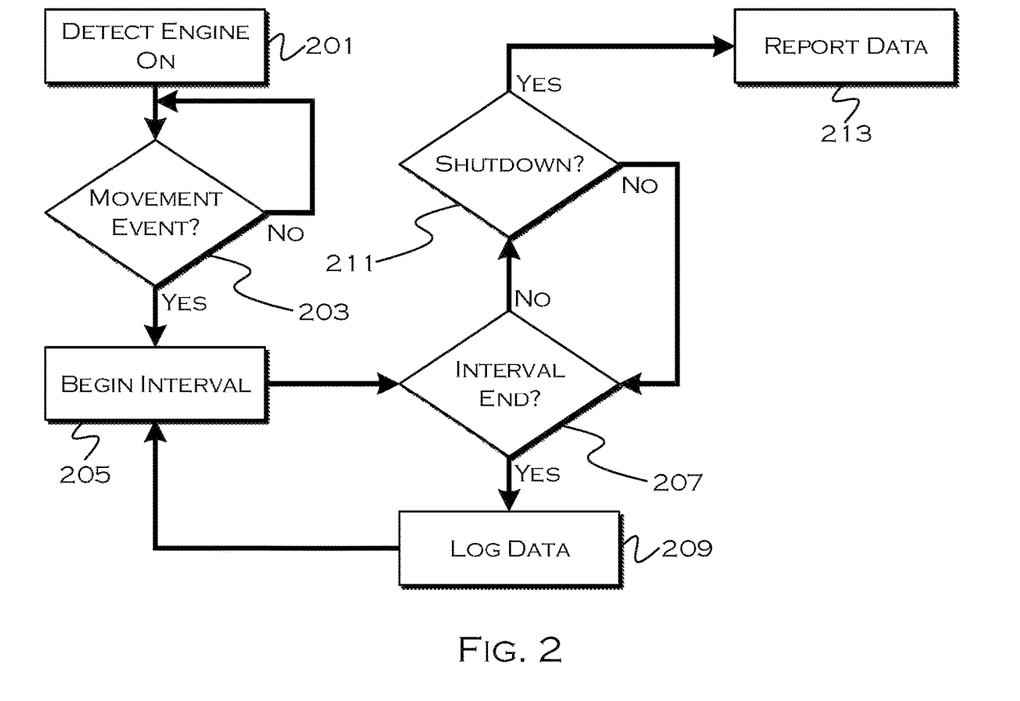
FIG. 2 shows an illustrative process for recording achieved efficiency, condition and driver behavior data over an interval of travel.

FIG. 2 shows an illustrative process for recording achieved efficiency, condition and driver behavior data over an interval of travel. This is a data gathering process that original equipment manufacturers (OEMs) can run on a variety of vehicles as they travel, to gather data on both driving behavior and road conditions. The data can serve a dual purpose, it can be used to improve and refine an individual driver profile and it can serve to represent fuel efficiency achieved under certain conditions with certain driving behavior in a certain vehicle.

This illustrative process runs repeatedly while a vehicle is turned on, to gather discrete intervals of data usable to model out both individual expectations and vehicle expectations. When the process detects 201 an engine being activated, the process can begin. It is also possible to gather data for each journey, and then analyze the whole journey if that is a preferred methodology. This gathering at intervals simply avoids having to break apart a journey after the fact, and allows for smaller and more frequent reporting, but it is not necessarily the only suitable method for gathering individual or vehicle data.

In this example, the process waits 203 until a vehicle begins to move (typically achieves a minimum speed, so to ensure the vehicle is not being moved in a driveway to another location, for example). Once the vehicle passes a movement threshold, the process begins 205 a data-gathering interval (minutes, miles, etc). Until the interval ends 207 or the vehicle is powered down 209, the process can continue to record data onboard. The data can include, for example, weather conditions, road conditions (detectable by sensors), speeds traveled, acceleration and braking, traffic encountered, GPS coordinates, stoppages and starts, and any other data that is known to affect fuel efficiency.

At the end of each interval, the process logs 209 the data in an onboard repository (in this example) and when the journey is over, the process reports 213 the logged data. The process could also simply report the data at intervals, if desired.

While it may seem that user profile data should be comprised of acceleration and stopping tendencies, as well as use of functions like cruise control (i.e., behavior-centric data), user profile data can also include condition and travel data. If the user is purchasing a new vehicle to be used over common routes in a common region (common to the current vehicle usage), then this data can all be relevant to determining what sort of actual fuel efficiency a user can expect. Thus, the user profile data can include both individual behavior data and environmental data.

Either or both types of data can be used in an efficiency calculation. For example, if a user wants to buy a new vehicle to be used in a new locale, the most useful data is the user behavior data, which can indicate what sort of efficiency is achieved by similarly behaving users in the new locale (assuming the new locale is provided as an input). On the other hand, if the user is not moving anywhere or changing driving locations and routes, both the condition data and the behavior data may be useful in predicting what sort of efficiency will be achieved.

Both types of data may also be useful in modeling efficiency in general. With so many variables, it may not always be clear whether it was a condition or behavior that adversely affected efficiency. But, with many users of similar behavior traveling under varied conditions, it can be easy to see when the condition, not the behavior, affects the efficiency. Similarly, with many users of varied behavior traveling under the same conditions, it can be easy to determine when the behavior, not the condition, affects the efficiency.

For example, if aggressive drivers A1 and A2 were traveling a highway at 60 mph in Florida and Michigan, in winter, the process may note that the adverse travel conditions caused by snow in Michigan created a 0.5 mpg decrease in efficiency. Or, if an aggressive driver A1 and a cautious driver C1 were both traveling the same route in Michigan, the process may note that the slow acceleration and deceleration of the cautious driver results in a 1 mpg increase in efficiency. With a large amount of data, users can be sorted into some fairly precise groupings, and when the cause-effect of conditions and behavior is known through modeling for a specific vehicle, the impact of very specific user-experienced conditions and behavior can be modeled. That is, if there is not an ideal candidate for a direct comparison, the process can determine various behavioral and condition tendencies for a user and estimate an mpg based on the modeling.

Figure 3:
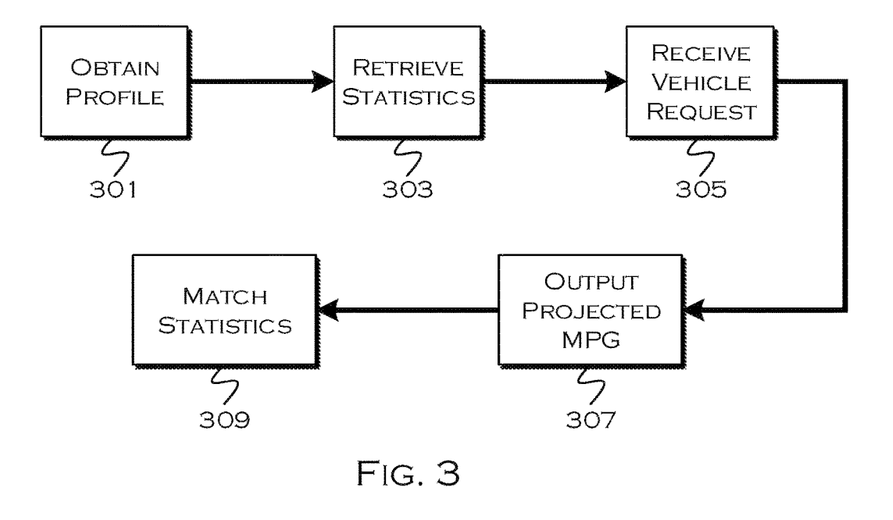
FIG. 3 shows an illustrative process for personalizing projected efficiency for a given vehicle.

At the same time, generalized user models and condition models can be built, so that a given user can hopefully be classified and compared to a given paradigm, which can allow a determination of how efficient the user will likely be in a completely different vehicle which the user has never actually driven, FIG. 3 shows an illustrative process for personalizing projected efficiency for a given vehicle. In this example, the process obtains 301 a profile for a given user. The user could be shopping at a dealership or could be shopping online. The profile could be stored on a vehicle, on a mobile device or on the cloud with respect to a user account.

Once the user profile is retrieved, the process can extract 303 relevant behavioral and condition statistics and data from the profile, to be used in a comparison. As part of the request, the process receives 305 identification of a particular vehicle for which efficiency data is desired.

The process then matches 307 the user to a driver (real or modeled) to which the user data corresponds. That is, the process either finds a driver with similar driving behavior or a model of a driver modeled after similar driving behavior. Also, if desired, and sufficient data exists, the process may match the user to a driver driving in conditions similar to that of the requesting user. This can include a driver experiencing speed limits, traffic, etc. for more than a threshold period of time, for situations in which the user also experiences these variables for more than a threshold period of time. Other comparisons can include, for example, general regional data (city or locality) and average travel speed. A locality can include, for example, a city or a region (X miles around a driver's home) in which the compared user may also travel frequently.

Once a suitable comparison has been made, the process can output 309 actual efficiency achieved by the compared party (the other driver) in the vehicle requested. If the user is compared to a model driver, the model driver will be based on observed characteristics, and so the output should be relatively precise as well. Since it is rare for people to be exactly alike in their behavior and travel habits, in some instances a direct comparison will be more accurate and in some instances a model will be more accurate. A model that accommodates the affects that certain behaviors have while in a certain vehicle model should eventually be more accurate, but that could require a significant amount of data. In the interim (until the model produces highly accurate results), it may be more effective to find a close match for another real human driver of the requested vehicle.

Figure 4:
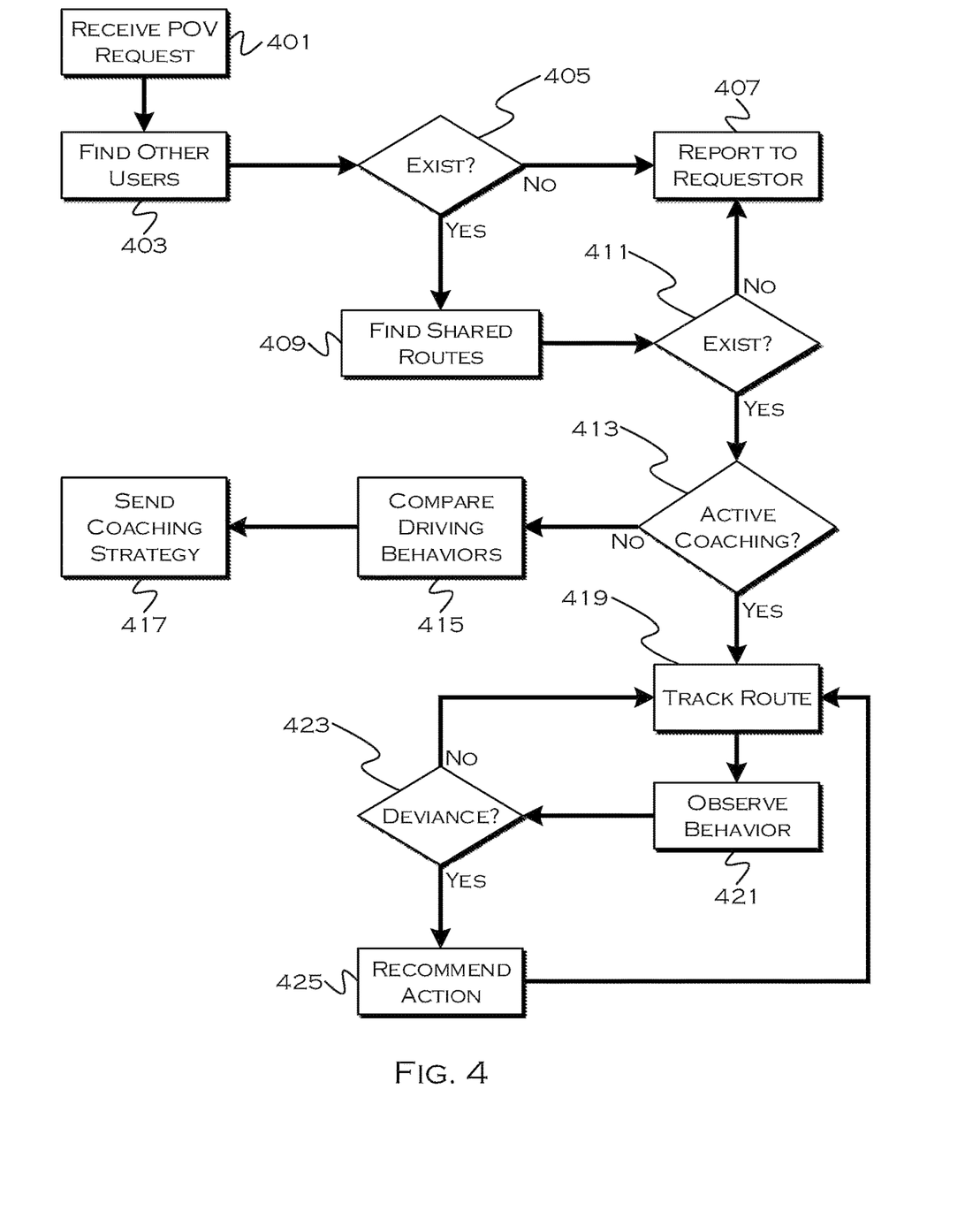
FIG. 4 shows an illustrative process for driving efficiency improvement.

FIG. 4 shows an illustrative process for driving efficiency improvement. In this example, a first user requests to improve driving efficiency. This process will find route segments over which a second user, having a higher fuel efficiency, recorded data. The route segment can be the literal copy of a current route segment, or a segment having similar characteristics (speed limits, stop signs, traffic levels, etc). By instructing the first user to behave in a manner more similar to the second user under similar conditions in which the second user achieved higher efficiency, the process can teach the first user how to improve fuel efficiency. The process can also track efficiency during this coaching period and even give feedback on how well the first driver was able to imitate the second driver.

One the process receives 401 the request, the process seeks 403 out a driver in the same model of vehicle who has traveled a similar route segment to an upcoming route segment for the requesting driver. If there is no more-efficient driver of the same model vehicle 405, the process may report 407 that efficiency mirroring is unavailable at this time. This could be due to the model being new, limited data having been gathered or the fact that the requesting driver is one of the most efficient drivers of that model of vehicle.

If the process finds a more efficient driver, the process then checks 409 to see if data has been recorded for any more efficient driver for behavior over a route similar to an upcoming route for the requesting driver. Since the chances of finding a more efficient driver, of the same model vehicle, over the same route, may be low, the process may use route data recorded for a route segment similar (similar speed limits, stops, traffic data, lanes, etc) to an upcoming route segment for the requesting driver. Of course, if there is data for the exact route segment under similar conditions, the process could use that data instead. If there are more efficient drivers, but no data 411 for those drivers over similar route segments, the process may again report the lack of data.

In this example, if there is a driver to model and data for the upcoming route segment, the process can provide active 413 or passive coaching. Active coaching includes instructions delivered to the driver while the driver is traveling. Passive coaching includes recording driver behavior over the route segment, comparing it to the more efficient driver's behavior and later informing the driver of changes in behavior that could be made. While passive coaching may not prove as effective as active coaching, it may also be less distracting for certain drivers, and in some instances such as a highly distracting environment (weather, traffic, etc) may be the only option available.

If the process is engaged in passive coaching, the process may track 415 comparisons of driver behavior over the segment (where the requesting driver is compared to the more efficient driver). At the end of the segment, when the requesting driver is no longer driving, the process may deliver 417 (visually, audibly, email, text, application, etc) an analysis, including recommended changes to driving behavior.

If active coaching is requested and/or appropriate, the process may begin to track 419 a user's behavior when the user reaches the stretch of route to which the more efficient user behavior is to apply. While the behavior of another user can be a decent model in many examples, using data of a user in the same vehicle over a common route segment (or a segment that is characteristically similar) can produce a more realistic copying feel for the driver, because the exemplary driver had to make similar decisions to the current driver, presumably.

The process observes 421 the user's behavior as the user drives (braking, cruise control use, acceleration, lane changing, etc) and if there is a deviance 423 from the efficient user's model behavior, the process can alert 425 the driver of how the other user would have acted in that scenario. This can be an after-the-fact alert or the alert can be provided in advance of a decision point (i.e., when the process knows the other user began braking, the process can instruct the current user to brake). Feedback (resistance, for example) can be used to let the driver know when the driver is braking or accelerating too aggressively, and generally this process can allow the current driver to achieve a more efficient set of driving habits based on behavior proven to be effective for a given vehicle.

Figure 5:
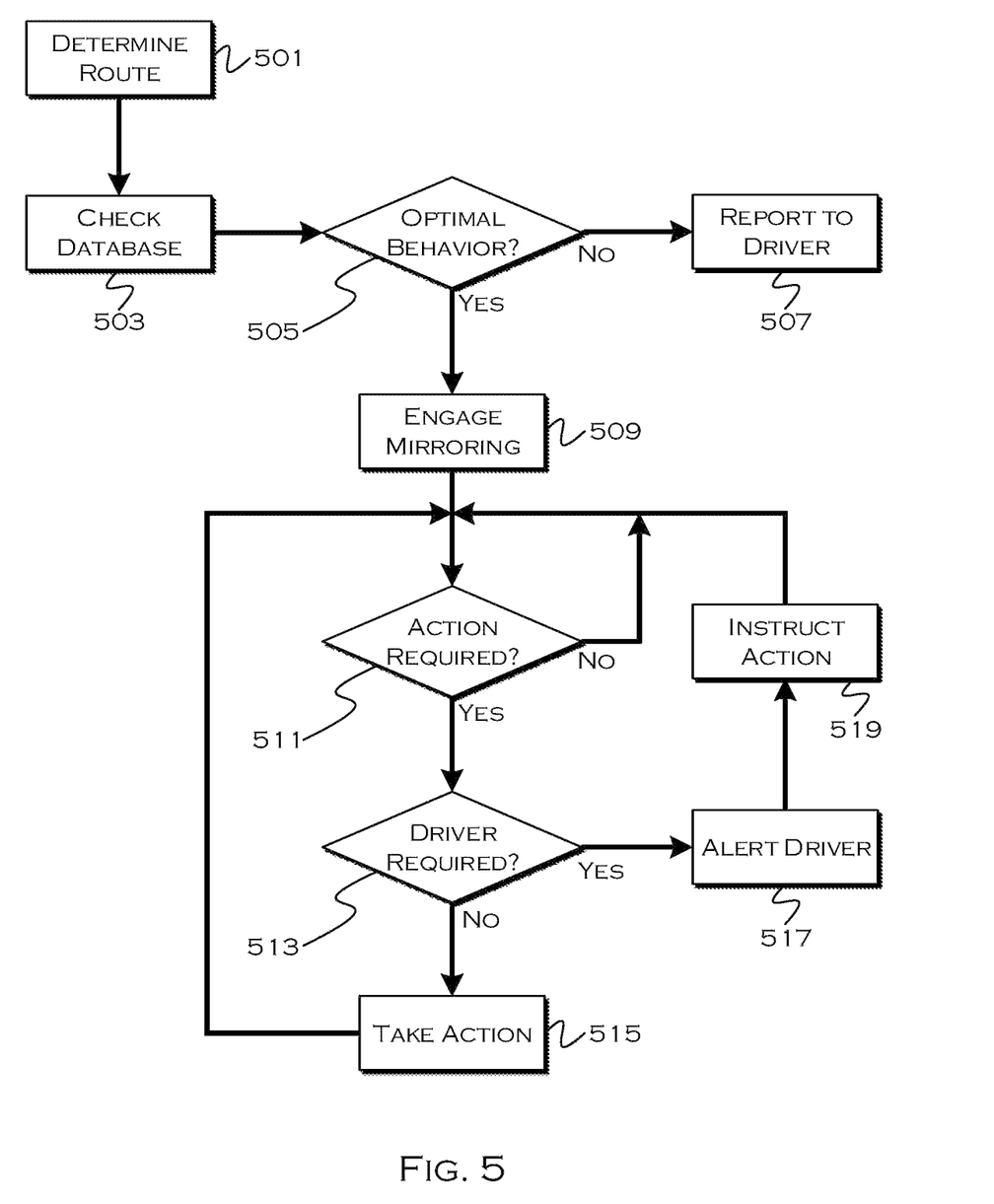
FIG. 5 shows an illustrative process for copying efficient driver behavior over a specific route.

FIG. 5 shows an illustrative process for copying efficient driver behavior over a specific route. In this example, the process can use a "smart" cruise control function to mirror behavior over a route, the behavior being that of a highly efficient driver observed over the same route. In this instance, the process uses the behavior of a driver over the literal same route segment, to accommodate for fixed obstacles such as lane availability and traffic controls. Behavior modeling coupled with HD map data (highly advanced map data that includes lanes and traffic control features) could be used in the place of the actual data, but in the example shown the real data from an efficient driver of the same model vehicle is used.

In this process, the user inputs a route and the process checks 501 the route for segments or long portions that might occur in a database. By comparing 503 aspects of the route to the database, segments that include optimal or high efficient behavior 505 can be identified. If no portions (or no portions of suitable length exist, the process can notify 507 the requesting driver.

If there is a route portion, segment, etc. with suitable model behavior associated therewith, the process can engage 509 a mirroring function, which will cause a cruise-control enabled vehicle to actually behave as the model driver behaved. This obviously has to accommodate traffic and other changes to the road, so a feature such as adaptive cruise control, which can adjust to present vehicles, will make this a possibility. If there is no adaptive cruise control available, the process may instead engage coaching as with FIG. 4.

If the system can adapt to present obstacles, the process will begin to mirror the behavior of the model driver. If an action such as braking or other change beyond a threshold 511 is required, the process determines 513 if this is an action that needs driver participation. That is, if a lane change, a turn or other action is needed, the process may require the driver to participate in the action, and in many cases, driver participation may be necessary. The process alerts 517 the driver in advance of the action, and the process instructs 519 the driver with what action to take and when. Once the action is completed, mirroring can resume. If the action does not require a driver action, then the process can take 515 the required action without asking the driver. In an alternative embodiment, the process may provide an opt in or opt out function, whereby one or more certain actions are presented to the driver before being undertaken. For example, if a vehicle was capable of changing lanes without driver interaction, that option may be presented to the driver. Or, if significant acceleration or deceleration were going to be undertaken, the driver could opt out of a particular action, or opt in.

Through the use of illustrative embodiment, personalized realistic MPG requirements can be calculated for vehicles which a user has never driven, and the user can further both learn and have a vehicle controlled based on more efficient drivers driving the same model of vehicle.

The illustrative embodiments allow for utilization of both local and remote processing, and using bandwidth constraints and connection availability and connectivity options to dynamically redistribute processing in a manner that can better use available resource when those resources are actually available.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive a request from an identified user for predicted fuel efficiency to be achieved by the identified user using a vehicle of a type, based on a vehicle model, defined in the request;
receiving a user profile for the identified user, responsive to the request;
obtain efficiency-affecting data from the user profile indicating at least one of user driving-behavior predefined as affecting fuel efficiency or route-related data predefined as affecting fuel efficiency;
compare the efficiency-affecting data to corresponding data gathered from drivers of the vehicle model to determine a correlation between the user profile and other drivers of the vehicle model, the correlation identifying data from the other drivers pertinent to determining fuel efficiency for the user using the vehicle of the type, the correlation determined based on predefined parameters, corresponding to a given data type of the efficiency-affecting data, the parameters identifying what constitutes a correlation for the given data type;
select at least one of the other drivers as a basis for predicting fuel efficiency for the identified user, based on fuel efficiency experienced by the at least one driver using the vehicle model, the selecting based at least in part on more than a predefined threshold degree of correlation between the identified user and the at least one driver, derived from the comparing;
predict a value for fuel efficiency for the user using the vehicle model based fuel efficiency experienced by at least one driver of the other driver; and
report the predicted fuel efficiency responsive to the identified user.

2. The system of claim 1, wherein the efficiency-affecting data includes user driving behavior and wherein the parameters for driving behavior comparison define a correlation to ones of the other drivers' driving behavior based on a classification of the user driving behavior compared to classifications of the ones of the other drivers' driving behavior.

3. The system of claim 1, wherein the efficiency-affecting data includes user route data.

4. The system of claim 3, wherein the route data includes historical route characteristics encountered by the user more than a predefined threshold amount of time and wherein the parameters for historical route characteristic comparison define a correlation to other drivers based on ones of the other drivers encountering the same route characteristics for more than the predefined threshold amount of time.

5. The system of claim 4, wherein the route characteristics include traffic.

6. The system of claim 4, wherein the route characteristics include one or more specific road speed limits.

7. The system of claim 3, wherein the route data includes route data for an upcoming route along which the user is traveling.

8. The system of claim 3, wherein the route data includes a geographic locality and wherein the parameters for geographic locality comparison define a correlation to other drivers based on ones of the other drivers traveling within a predefined geographic region with a predefined threshold frequency.

9. The system of claim 8, wherein the predefined geographic region includes a predefined region around a reference point defined with respect to the identified user.

10. The system of claim 1, wherein the other drivers include a model driver generated from accrued user behavior observed as being exhibited by at least the other drivers, the model driver generated to have model driving behavior characteristics corresponding to driving-behavior characteristics of the user, obtained from the user profile, and having defined efficiency determined based on effects on efficiency for a given characteristic and a value of the given characteristic, ascribed to the model driver, the effect the value of the given characteristic has being an expected effect for the value based on observation of the real effects on efficiency achieved by a plurality of varied values of the given characteristic pertaining to the other drivers.

11. A non-transitory storage medium storing instructions that, when executed, cause one or more processors of a vehicle to perform a method comprising:
receiving a request from an identified user for predicted fuel efficiency to be achieved by the identified user using a vehicle of a type, based on a vehicle model, defined in the request;
receiving a user profile for the identified user, responsive to the request;
obtaining efficiency-affecting data from the user profile indicating at least one of user driving-behavior predefined as affecting fuel efficiency or route-related data predefined as affecting fuel efficiency;
comparing the efficiency-affecting data to corresponding data gathered from drivers of the vehicle model to determine a correlation between the user profile and other drivers of the vehicle model, the correlation identifying data from the other drivers pertinent to determining fuel efficiency for the user using the vehicle of the type, the correlation determined based on predefined parameters, corresponding to a given data type of the efficiency-affecting data, the parameters identifying what constitutes a correlation for the given data type;
selecting at least one of the other drivers as a basis for predicting fuel efficiency for the identified user, based on fuel efficiency experienced by the at least one driver using the vehicle model, the selecting based at least in part on more than a predefined threshold degree of correlation between the identified user and the at least one driver, derived from the comparing;
predicting a value for fuel efficiency for the user using the vehicle model based on fuel efficiency experienced by at least one driver of the other drivers;
presenting the predicted fuel efficiency responsive to the identified user via a display of the vehicle.

12. The storage medium of claim 11, wherein the efficiency-affecting data includes user driving behavior and wherein the parameters for driving behavior comparison define a correlation to ones of the other drivers' driving behavior based on a classification of the user driving behavior compared to classifications of the ones of the other drivers' driving behavior.

13. The storage medium of claim 11, wherein the efficiency-affecting data includes user route data.

14. The storage medium of claim 13, wherein the route data includes historical route characteristics encountered by the user more than a predefined threshold amount of time and wherein the parameters for historical route characteristic comparison define a correlation to other drivers based on ones of the other drivers encountering the same route characteristics for more than the predefined threshold amount of time.

15. The storage medium of claim 14, wherein the route characteristics include traffic.

16. The storage medium of claim 14, wherein the route characteristics include one or more specific road speed limits.

17. The storage medium of claim 13, wherein the route data includes a geographic locality and wherein the parameters for geographic locality comparison define a correlation to other drivers based on ones of the other drivers traveling within a predefined geographic region with a predefined threshold frequency.

18. The storage medium of claim 17, wherein the predefined geographic region includes a predefined region around a reference point defined with respect to the identified user.

* * * * *